United States Patent
Chen

(10) Patent No.: US 11,429,880 B2
(45) Date of Patent: *Aug. 30, 2022

(54) METHODS AND SYSTEMS FOR PRELOADING APPLICATIONS AND GENERATING PREDICTION MODELS

(71) Applicant: GUANGDONG OPPO MOBILE TELECOMMUNICATIONS CORP., LTD., Guangdong (CN)

(72) Inventor: Yan Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 1027 days.

This patent is subject to a terminal disclaimer.

(21) Appl. No.: 16/110,359

(22) Filed: Aug. 23, 2018

(65) Prior Publication Data

US 2019/0138919 A1 May 9, 2019

(30) Foreign Application Priority Data

Nov. 6, 2017 (CN) .......................... 201711078330.2

(51) Int. Cl.
  *G06N 5/04* (2006.01)
  *G06F 9/445* (2018.01)
  (Continued)

(52) U.S. Cl.
  CPC ................. *G06N 5/04* (2013.01); *G06F 7/08* (2013.01); *G06F 9/445* (2013.01);
  (Continued)

(58) Field of Classification Search
  CPC .. G06N 5/04; G06N 20/00; G06F 7/08; G06F 9/445; G06F 9/44521; G06F 9/4451
  See application file for complete search history.

(56) References Cited

U.S. PATENT DOCUMENTS

2013/0173513 A1* 7/2013 Chu ....................... G06F 9/451
  706/14
2014/0372356 A1* 12/2014 Bilal ................... G06F 9/44578
  706/46
(Continued)

FOREIGN PATENT DOCUMENTS

CN  103593479 A  2/2014
CN  104657183 A  6/2015
(Continued)

OTHER PUBLICATIONS

Chinese Office Action in corresponding Chinese Patent Application No. 201711078330.2 dated Jan. 22, 2020.
(Continued)

*Primary Examiner* — Haoshian Shih
(74) *Attorney, Agent, or Firm* — Ladas & Parry LLP

(57) ABSTRACT

An application preloading method and apparatus, and a prediction model generation method and apparatus are described. Application preloading may include obtaining application usage state information of a terminal and contextual information of the terminal; inputting the obtained application usage state information and contextual information into a pre-generated prediction model that is configured for predicting application startup and for calculating at least one prediction value for the application startup; determining an application to be started according to the at least one prediction value, and preloading the application to be started. The prediction model may be pre-generated according to usage association information of applications within a predetermined time period and contextual information of the terminal corresponding to the usage association information.

17 Claims, 5 Drawing Sheets

(51) Int. Cl.
*G06N 20/00* (2019.01)
*G06F 7/08* (2006.01)

(52) U.S. Cl.
CPC ......... *G06F 9/44521* (2013.01); *G06N 20/00* (2019.01); *G06F 9/4451* (2013.01)

(56) References Cited

U.S. PATENT DOCUMENTS

| | | | | |
|---|---|---|---|---|
| 2015/0013013 | A1* | 1/2015 | Li | G06F 21/60 726/26 |
| 2015/0373132 | A1* | 12/2015 | Mukherji | H04L 67/10 709/203 |
| 2018/0004856 | A1* | 1/2018 | Levi | G06F 16/9535 |

FOREIGN PATENT DOCUMENTS

| | | |
|---|---|---|
| CN | 104951340 A | 9/2015 |
| CN | 105677378 A | 6/2016 |
| CN | 105701113 A | 6/2016 |
| CN | 107273011 A | 10/2017 |
| CN | 107783801 A | 3/2018 |
| WO | 2017/057912 A1 | 4/2017 |

OTHER PUBLICATIONS

Third Chinese Office Action dated Sep. 27, 2020 for Application No. CN 201711078330.2.
International Search Report (ISR) and Written Opinion (WO) dated Jan. 22, 2019 for Application No. PCT/CN2018/114166.
English translation of CN 107783801 A.
English translation of CN 104951340 A.
English translation of CN 105701113 A.
Espacenet English abstract of CN 105677378A.
Espacenet English abstract of CN 104657183 A.
English translation of WO 2017/057912 A1.
Yan, T, et al., "Fast App Launching for Mobile Devices Using Predictive User Context", MobiSys' 12, Jun. 25-29, 2012, 14 pages.
EP Examination Report dated Nov. 19, 2021 for Application No. EP 18 194 430.7.
Indian Examination Report dated Jun. 22, 2020 for Application No. IN 201814041570.
Chinese Office Action dated Jul. 1, 2020 for Application No. CN 201711078330.2.

* cited by examiner

METHODS AND SYSTEMS FOR PRELOADING APPLICATIONS AND GENERATING PREDICTION MODELS

CROSS-REFERENCE TO RELATED APPLICATION

The present application claims priority to Chinese patent application No. 201711078330.2 filed on Nov. 6, 2017, the entire contents of which are hereby incorporated by reference.

TECHNICAL FIELD

The present disclosure relates to electronic technology, and more particularly to methods, apparatuses, terminals, and non-transitory computer readable media for application preloading and prediction model generation.

BACKGROUND

With the rapid development of electronic technology and improvement of people's living standards, smart phones, tablet personal computers and other terminals have become an indispensable part of people's lives. With the popularity of terminals, a variety of applications (APPs) have emerged to meet various demands of users. In some scenarios, in efforts to make applications run more smoothly, a terminal may load the resources of some applications in advance, i.e., preload the applications. However, arbitrary preloading of applications may unnecessarily consume bandwidth, as well as substantial memory and processing resources of the terminal, which may adversely affect the user experience, and increase the power consumption and data usage of the terminal. Therefore, a need exists for improved techniques for preloading of applications.

SUMMARY

Embodiments provide methods, devices, systems, terminals, and non-transitory computer readable media for application preloading.

In one aspect, an application preloading method is provided. The method may include obtaining application usage state information of a terminal and contextual information of the terminal. The method may further include inputting the application usage state information and the contextual information into a prediction model that may be generated in advance (e.g., a predetermined prediction model). The prediction model may predict application startup, and calculate at least one prediction value for the application startup. An application to be started according to the at least one prediction value may be determined, and the application to be started may be preloaded. The prediction model may be generated in advance according to usage association information of applications within a predetermined time period and contextual information of the terminal corresponding to the usage association information.

In another aspect, a prediction model generation method may be provided. The method may include obtaining a user behavior sample within a predetermined time period, the user behavior sample including usage association information of at least two applications. The method may further include extracting contextual information of a terminal corresponding to the usage association information of the applications. The usage association information and the contextual information may be input as training data into a predetermined algorithm model, and the prediction model for predicting application startup may be obtained through training.

In yet another aspect, a terminal may be provided. The terminal may include a memory, a processor, and a computer program stored in the memory that is executable by the processor to obtain application usage state information of the terminal and contextual information of the terminal. The application usage state information and the contextual information may be input into a prediction model that may be generated in advance. The prediction model may predict application startup, and calculate at least one prediction value for the application startup. An application to be started according to the at least one prediction value may be determined, and the application to be started may be preloaded. The prediction model may be generated in advance according to usage association information of applications within a predetermined time period and contextual information of the terminal corresponding to the usage association information.

A better understanding of the nature and advantages of embodiments of the application may be gained with reference to the following detailed description and the accompanying drawings.

BRIEF DESCRIPTION OF DRAWINGS

The accompanying drawings are used to provide a further understanding of the techniques discussed herein, and are not intended to limit the claims appended hereto. The components in the figures are not necessarily to scale, emphasis instead being placed upon illustrating the techniques discussed herein. Moreover, in the figures, like reference numerals designate corresponding parts throughout the different views.

DETAILED DESCRIPTION

Exemplary embodiments of the application are described in detail below with reference to the accompanying drawings in order to make the disclosure more clearly understood. It should be noted that one of skill in the art will understand that the exemplary embodiments and features therein may be combined with each other as desired.

The steps shown in the flowchart of the accompanying drawings may be performed at least in part by a computer system storing a set of computer-executable instructions. In addition, although a logical sequence may be shown in the flowcharts, in some cases the steps shown or described may be performed in a different sequence, or some steps may not be performed at all.

Preloading applications in a terminal or device may improve user experience. The preloading of applications may be achieved by preparing the loading resources of the applications in advance, such that the applications may run more smoothly (e.g., by not invoking delays that may be associated with loading).

The preloading of applications may be performed based on statistics. For example, through the statistics of the terminal user's habits in using applications, a number of applications that are most frequently used by the terminal user may be preloaded. However, in practice, only one application at a time may be used by the user. Typical application preloading techniques may fail to preload the particular application that the terminal user may start next in time. Although typically the preloaded applications may be selected according to the user's habits in using the applications, applications that are not to be started may also be preloaded, which may adversely affect the user experience (e.g., unnecessarily consuming substantial memory, bandwidth, processing time, power, etc.).

Thus, if the application that will be started by the user next in time can be predicted, the terminal may only preload the application that will be started next, which may substantially reduce, at least, consumption of resources, reduce the power consumption, and improve the overall user experience (e.g., by reducing delays associated with loading applications).

Figure 1:
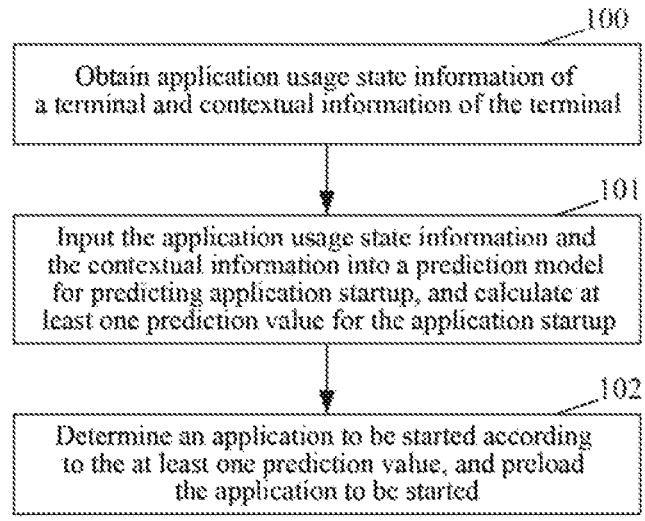
FIG. 1 is a flowchart of an application preloading method according to an embodiment of the disclosure.

FIG. 1 is a flowchart of an application preloading method according to an embodiment. As shown in FIG. 1, the application preloading method may include steps 100-102.

In step 100, application usage state information of a terminal and contextual information of the terminal may be obtained.

In an exemplary embodiment, before the step 100, the method may also include triggering a prediction for a preloaded application. When the user behavior at a next point in time may need to be determined, the prediction for the preloaded application may be triggered. For example, when the number (i.e., a cardinality) of background processes reaches a predetermined MAX_HIDDEN_APPS value and a new App (application) may need to be started, the prediction for the preloaded application may be triggered. Alternatively, the user of the terminal may trigger the prediction for the preloaded application at any time by selecting a predetermined function option or icon or the like.

In an exemplary embodiment, the application usage state information may include information of an application currently in use, or information indicating that no application is currently in use. If there is an application currently in use, the application usage state information of the terminal may be represented by identification information or icon information corresponding to the application currently in use. If there is no application currently in use, the application usage state information of the terminal may be represented by identification information indicating no application is currently in use. It should be noted that one of skill in the art will understand that the application usage state information may be represented in other forms.

The contextual information of the terminal may include the contextual information of the terminal at the point in time when the application usage state information is obtained. The contextual information may include scene information indicating the environmental state in which the terminal is located, such as time information, location information, etc., and state information of the terminal, such as display screen on/off information, power quantity information (e.g., battery power level), network connection information, information indicating whether the terminal is in a charging state, etc.

In an exemplary embodiment, the contextual information of the terminal may include any one or more of time information, display screen on/off information, power quantity information, network connection information, location information, or information indicating a charging state of the terminal (e.g., whether the terminal is currently charging, or not charging).

In an exemplary embodiment, the method may further include determining a usage time category of an application according to the current time information of the terminal in the contextual information of the terminal.

The usage time category may include a first time category, such as a date, and a second time category, such as a time period. In an exemplary embodiment, determining the usage time category of the application according to the current time information of the terminal in the contextual information may include: determining a usage date of the application currently in use according to the current time information of the terminal to obtain the first time category: determining a usage time period of the application currently in use according to the current time information of the terminal to obtain the second time category; and using the first time category and the second time category as the usage time category of the application currently in use. For example, the first time category may include a working day or a holiday. The second time category may include a morning peak, noon time, an evening peak, working time, and/or rest time.

In an exemplary embodiment, the second time category may also include daytime or evening time. Alternatively, the second time category may be obtained by equally dividing 24 hours (0:00-24:00) of a day, for example, into 6 time periods, wherein each time period spans 4 hours.

In an exemplary embodiment, the second time category may be recorded in the form of a timestamp.

The display screen on/off information in the contextual information of the terminal may include an indication that the display screen of the terminal is currently in an on state or an off state. The power quantity information in the contextual information of the terminal may include an indication of a quantity of power the terminal currently has, for example, an indication that the power quantity is high, medium or low. The network connection information in the contextual information of the terminal may include an indication of whether the terminal is currently connected to a network, for example, whether the terminal is connected to wifi, whether the terminal is connected to a mobile network, etc. The location information in the contextual information of the terminal may include the current location of the terminal, for example, an indication of whether the terminal is at home or not (or an indication that the terminal is currently inside an office at work, a board room, a coffee shop, a library, etc.). Information indicating whether the terminal is charging in the contextual information of the terminal may include an indicator indicating whether the terminal is currently in a charging state.

In an example embodiment, different contextual information may be denoted in different forms, e.g., in the form of text, or in the form of identification information, etc. In an exemplary embodiment, the identification information may include a numerical value corresponding to a category of contextual information. For example, the power quantity information may be divided into categories indicated as high, medium and low. For example, when the power quantity is high, it may be represented by the value 0, when the power quantity is medium, it may be represented by the value 1, and when the power quantity is low, it may be represented by the value 2. One of skill in the art will understand that numerous other representations are also possible, and that other power levels may also be represented. As another example of categorization, location information may be categorized as at home and not at home. For example, when the terminal is at home, the value 0 may be used, and when the terminal is not at home, the value 1 may be used. One of skill in the an will understand that numerous other representations are also possible, for other locations of the terminal.

In step 101, the obtained application usage state information and contextual information may be input into a prediction model for predicting application startup, and at least one prediction value for the application startup may be calculated.

Figure 2:
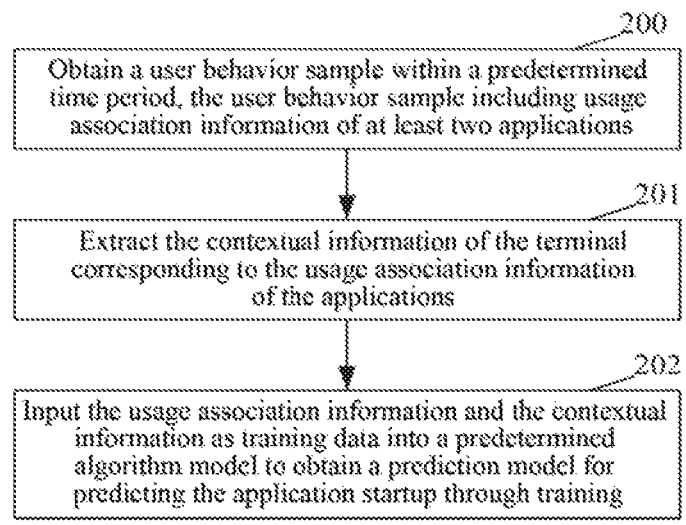
FIG. 2 is a flowchart of a prediction model generation method according to a first embodiment of the disclosure.

The prediction model for predicting application startup may be generated according to usage association information of applications within a predetermined time period and the contextual information of the terminal corresponding to the usage association information. The usage association information may be, for example, a usage time sequence association record. A flowchart of an example technique for generating the prediction model for predicting application startup is shown in FIG. 2 (discussed below).

In an exemplary embodiment, the usage association information may include application usage state information at each sampling point in time within the predetermined time period and a time sequence of using applications within the predetermined time period. For example, if the predetermined time period is 8:00-20:00, the usage association information of applications may indicate that the user uses a Taobao App at 8:00, switches from the Taobao App to a JingdongMall App at 8:30, and switches from the Jingdong-Mall App to an AliPay App at 9:00; or that the user uses a Meituan App at 11:40 and switches from the Meituan App to a Wechat App at 12:00.

In an exemplary embodiment, calculating at least one prediction value for the application startup by using the prediction model that is generated in advance for predicting application startup and the obtained application usage state information and contextual information may include inputting the obtained application usage state information of the terminal at the current point in time and the corresponding contextual information of the terminal into the prediction model that is generated in advance for predicting application startup. The prediction model for predicting application startup may process and output at least one probability value for the application startup in the terminal at the next point in time.

In an exemplary embodiment, the prediction model for predicting application startup may be generated by training the usage association information of M applications within the predetermined time period and the corresponding contextual information of the terminal. Then, when predicting the application startup, the prediction model may output (M+1) probability values that may include M probability values, each of the M probability values indicating a probability for starting a respective one of the M applications.

One additional probability value (i.e., numbered as probability value number M+1) may indicate a probability that no application will be used.

In an example embodiment, in step 100, the method may also include obtaining the application usage state information of the terminal at a last point in time before the current point in time (i.e., a last point in time that is, in temporal order, immediately previous to the current point in time). Correspondingly, the information input into the prediction model for predicting application startup in step 101 may include the application usage state information of the terminal at the last point in time before the current point in time. That is, in step 101, the obtained application usage state information of the terminal at the last point in time before the current point in time and the corresponding contextual information of the terminal, and the obtained application usage state information of the terminal at the current point in time and the corresponding contextual information of the terminal may be input into the prediction model that is generated in advance for predicting application startup. The prediction model for predicting application startup may process and output at least one probability value, for application startup in the terminal at the next point in time.

In step 102, an application to be started may be determined according to the obtained at least one prediction value, and the application to be started may be preloaded.

In an exemplary embodiment, an application corresponding to a maximal probability value among the probability values obtained in step 101 may be determined as the application to be started. When the probability value indicating that no application will be used is the maximal value, an application with a second largest probability value (i.e., the probability value that is less than the maximal probability value, and that is next largest, in numerical order, to the maximal value) may be determined as the application to be started. In this way, the application to be started may be preloaded to improve resource usage efficiency and smoothness of execution when the user uses the application.

In accordance with an example application preloading method discussed herein, the application to be started may be more accurately predicted by using the application usage state information and the corresponding contextual information of the terminal, which may advantageously more accurately reflect the user behavior. In this way, a targeted application preloading may be realized, the application preloading technique may be optimized, and the user experience may be improved. Example techniques discussed herein may thus not only improve terminal resource usage, improve power consumption, and improve smoothness of usage of the terminal due to preload of unnecessary resources of applications, but may also effectively improve an accuracy of the prediction for the application to be started, and may further reduce the power consumption and memory consumption of the terminal system (as well as reducing bandwidth usage, data usage, etc.).

An example embodiment of the application may provide a non-transitory computer readable storage medium storing computer-executable instructions. When the computer-executable instructions are executed, the application preloading method may be implemented.

As used herein, storage medium may refer to any type of memory device or storage device. The term "storage medium" is intended to include: installation medium, such as CD-ROM, floppy disk or tape device; computer system memory or random access memory such as DRAM, DDR-RAM, SRAM, EDORAM, Rambus RAM, etc.; non-volatile memory, such as flash memory, magnetic medium (e.g., hard disk or optical storage); registers or other similar types of memory elements, etc. The storage medium may also include other types of storage or combinations thereof. In addition, the storage medium may be located in a first computer system in which the program is executed, or may be located in a different second computer system connected to the first computer system through a network such as the internet. The second computer system may provide program instructions to the first computer for execution. The term "storage medium" may include two or more storage media that may reside in different locations (e.g., different computer systems connected through a network). The storage medium may store program instructions (e.g., embodied as a computer program) executable by one or more processors.

The computer-executable instructions in the computer readable storage medium are not limited to any of the application preloading operations discussed above, but may also implement related operations for application preloading provided by any technique as discussed herein.

FIG. 2 is a flowchart of a prediction model generation method according to an embodiment. As shown in FIG. 2, the prediction model generation method may include steps 200-202.

In step 200, a user behavior sample within a predetermined time period may be obtained. The user behavior sample may include usage association information of at least two applications. The usage association information may be, for example, a usage time sequence association record.

In an exemplary embodiment, the user behavior sample within the predetermined time period may include historical usage association information of the user's usage of applications in the terminal within the predetermined time period. For example, if the predetermined time period is 8:00-20:00, the usage association information of applications used by the user may indicate that the user uses a Taobao App at 8:00, switches from the Taobao App to a JingdongMall App at 8:30, and switches from the JingdongMall App to an AliPay App at 9:00; or the user uses a Meituan App at 11:40 and switches from the Meituan App to a Wechat App at 12:00.

In an exemplary embodiment, the usage association information may include application usage state information at each sampling point in time within the predetermined time period, and a time sequence of using applications within the predetermined time period.

In an exemplary embodiment, the at least two applications may include all applications used in the terminal within the predetermined time period.

Typically, multiple various applications may be installed in a terminal. However, the number (i.e., cardinality) of applications used by a user within a predetermined time period, such as one day, may be limited, and the number of applications frequently used by the user may also be limited. Most applications may be used at a low frequency and may only be used by the user once in a week or even in a month. To further reduce an amount of data of the training sample and to further improve accuracy of the prediction model generation for predicting the application startup, in an exemplary embodiment, at least two applications may include applications that are used in the terminal in a high frequency within the predetermined time period, that is, applications frequently used by the user.

In an exemplary embodiment, obtaining a user behavior sample within a predetermined time period may include sorting applications according to usage frequencies of the applications within the predetermined time period; determining at least two target applications according to the sorting result; and determining the usage association information based on usage state information of the target applications, and using the usage association information as the user behavior sample.

By excluding applications with low usage frequency from the training sample, not only may the amount of data for the training sample be reduced when the prediction model for predicting application startup is generated, but also the accuracy and efficiency of the prediction model generation for predicting application startup may be improved, thus further improving the accuracy of the prediction of the application to be started.

For example, if the predetermined (i.e., preset) time period is 8:00-22:00), the usage frequency of each application in the terminal during the predetermined time period may be counted. Then applications may be sorted according to the usage frequency of each application, e.g., applications may be sorted in numerical order of usage frequency from high to low. Then, according to the sorting result, the first M applications (in the ordering) may be selected as the target applications, i.e. the first M applications may be determined to be frequently used by the user, where M is a predetermined (e.g., a threshold) value, $M \geq 2$. Finally, the usage association information may be determined according to the usage state information of the target applications. Herein, the usage association information indicates the usage status of the M target applications by the user at each sampling point in time within the predetermined time period, including the usage of the M target applications by the user and the corresponding time points (i.e., points in time) when the target applications are used, and also including the time sequence of using the M target applications.

During usage of applications in terminals, invalid application usage may occur due to the user's misoperation. For example, the user may intend to trigger a Taobao App but mistakenly clicks on a compass App. In this case, the user may quickly exit the compass App. In order to further improve the accuracy of the prediction model for predicting application startup, in an exemplary embodiment, the method further may include filtering out invalid application usage record entries from a historical usage record of applications within the predetermined time period (i.e., deleting invalid application usage record entries from the application usage record within the predetermined time period).

In an exemplary embodiment, an application, the usage time of which is less than a predetermined time threshold, may be deleted from the application usage records. For example, if the user uses application A for 3 seconds and the predetermined time threshold is 5 seconds, then the usage record entry of application A may be deleted. By removing invalid application usage record entries from the application usage record, the accuracy of the prediction model for predicting application startup may be effectively improved, thus improving the accuracy of predicting the application to be started.

It should be noted that invalid application usage record entries may be filtered out from the application usage record, and then target applications (i.e., applications frequently used by users) may be determined according to the usage frequencies of the applications. Alternatively, the target applications (i.e. the applications frequently used by users) may be determined first according to the usage frequencies of the applications, and then invalid application usage record entries may be filtered out from the application usage record. Example techniques discussed herein may not limit the sequence of the filtering of invalid application usage record entries and the determining of the target applications according to the usage frequencies of the applications.

In an exemplary embodiment, determining the usage association information based on usage state information of the target applications may include: sampling usage logs of the target applications according to a predetermined sampling period to determine usage state information of the target applications at each sampling point in time; associating usage state information of at least two target applications according to the sampling points in time to determine the usage association information. Thereby, the usage association information of the applications within the predetermined time period may be obtained flexibly, and the accuracy of the prediction model for predicting the application startup may be improved, thus further improving the accuracy of predicting the application to be started.

In an exemplary embodiment, sampling the usage logs of the target applications according to the predetermined sampling period may include: sampling the usage logs of the target applications in every three minutes within the predetermined time period, and performing the first sampling at the initial time of the predetermined time period. For example, the predetermined time period may be 8:00-12:00, at 8:00 the first sampling may be performed, at 8:03 the second sampling may be performed, at 8:06 the third sampling may be performed, . . . , and so forth, till the sampling of the usage logs of the target applications within the predetermined time period is completed. Herein, the predetermined sampling period may be set according to the length of the predetermined time period. When the predetermined time period is determined to be long, the predetermined sampling period may be adaptively set longer. When the predetermined time period is determined to be short, the predetermined sampling period may be adaptively set shorter. Alternatively, the predetermined sampling period may be set according to the user's requirement. When the prediction accuracy of the application to be started is required to be high (e.g., as a user requirement), the sampling period may be set to be shorter. When the requirement for the prediction accuracy of the application to be started is not high (e.g., as a user requirement), the sampling period may be set longer. Alternatively, the predetermined sampling period may be set according to the terminal's capability of processing data. The sampling period may be set shorter when the terminal's capability of processing data of the training sample which is used for generating the prediction model is higher. The sampling period may be set longer when the terminal's capability of processing data of the training sample which is used for generating the prediction model is lower. Example techniques discussed herein may not limit the length of the predetermined sampling period and the manner of setting the predetermined sampling period.

Generally at a sampling point in time, there may be only one target application in use; or, no target application may be in use at the sampling point in time, for example, the terminal may be in a desktop state, or the display screen of the terminal may be in an off state, etc. Usage state information of at least two target applications may be associated according to the sampling points in time to determine the usage association information. For example, at a first sampling point in time the application A may be in the use state, at a second sampling point in time the application B may be in the use state, at a third sampling point in time the display screen of the terminal may be in the off state, marked as no application is in use, at a fourth sampling point in time the application C may be in the use state, . . . , and then the usage state information of the applications may be associated according to the sampling points in time to determine the usage association information.

In an exemplary embodiment, the usage association information of the applications may be recorded in the form of the sampling points in time and identification information of usage state information. For example, M target applications may be identified as 1, 2, . . . , M respectively in numerical order of usage frequency from high to low, and if no application is in use at the sampling point in time, identified as M+1. The 1, 2, . . . , M, M+1 may be used as the identification information of the usage state information of the applications, and the usage association information of the applications may be recorded by the identification information of the usage state information of the applications corresponding to the sampling points in time. It should be noted that embodiments of the application do not limit the specific representation manner of the usage association information. Any representation manner may be used as long as the usage state information of applications at the sampling points in time is represented by unique information.

In step 201, the contextual information of the terminal corresponding to the usage association information of the applications may be extracted.

In an exemplary embodiment, there may be one piece of contextual information of the terminal corresponding to usage association information of the applications at each point in time within the predetermined time period. At different points in time usage association information of the applications may correspond to different contextual information of the terminal. The contextual information of the terminal may include, e.g., scene information indicating the environmental state in which the terminal is located, such as time information, location information, etc., and state information of the terminal, such as display screen on/off information, power quantity information (e.g., information indicating a power level), network connection information, information indicating whether the terminal is in a charging status, etc.

In an exemplary embodiment, the contextual information of the terminal may include any one or more of: time information, display screen on/off information, power quantity information, network connection information, location information, or information indicating whether the terminal is in a charging status.

Optionally, the method may further include determining a usage time category of an application in the usage association information of applications according to the time information in the contextual information of the terminal. The usage time category may include a first time category, such as a date, and a second time category, such as a time period.

In an exemplary embodiment, determining the usage time category of an application in the usage association information of applications according to the time information in the contextual information of the terminal may include: determining a usage date of the application according to the time information of the terminal to obtain the first time category; determining a usage time period of the application according to the time information of the terminal to obtain the second time category: and using the first time category and the second time category as the usage time category of the application. The first time category may include a working day or a holiday. The second time category may include one or more of a morning peak, noon time, an evening peak, working time, or rest time.

In an exemplary embodiment, the second time category may also include daytime or evening time. Alternatively, the second time category may be obtained by equally dividing 24 hours (0:00-24:00) of a day, for example, into 6 time periods, wherein each time period spans 4 hours.

In an exemplary embodiment, the second time category may be recorded in the form of a timestamp.

In an exemplary embodiment, different contextual information may be denoted in different forms, e.g., in the form of text, or in the form of identification information, etc. In an exemplary embodiment, the identification information may include a numerical value corresponding to a category of contextual information. For example, the power quantity information (e.g., power level information) may be divided into categories indicated as high, medium and low. For example, when the power quantity is high, it may be represented by the value 0, when the power quantity information is medium, it may represented by the value 1, and when the power quantity information is low, it may be represented by the value 2. For example, location information may be divided into: at home and not at home. For example, when the terminal is at home, the value 0 may be used; and when the terminal is not at home, the value 1 may be used.

In step 202, the obtained usage association information and contextual information may be used as training data and input into a predetermined algorithm model, to obtain the prediction model for predicting the application startup through training.

The algorithm model may be trained according to the usage state information corresponding to each sampling point in time in the usage association information and the contextual information of the terminal to obtain the prediction model for predicting the application startup. That is, the usage state information corresponding to the sampling points in time and the contextual information of the terminal may be used as training samples to train the algorithm model to generate the prediction model for predicting the application startup.

The number of elements in an input layer of the algorithm model may be determined according to a vector dimension of the usage association information and the contextual information of the terminal, and the number of elements in an output layer of the algorithm model may be determined according to the number of applications. The error function used in the algorithm model may include the cross entropy loss function, which may be indicated as:

$$J = \sum_{k=1}^{C} y_k \log(\hat{y}_k),$$

where $y_k$ represents a standard value of an application usage state; and $\hat{y}_k$ represents a predicted value of the application usage state, and J represents a cross entropy of the algorithm model; C=M+1, where M represents the number of applications.

In an exemplary embodiment, the algorithm model may include a neural network model. The neural network model may include the input layer, the hidden layer, and the output layer. The number of elements in the input layer (i.e., the number of neurons in the input layer) may be determined according to the vector dimension of the usage association information and the contextual information of the terminal. In an exemplary embodiment, an application to be used at point in time t+1 may be predicted by using the application used at point in time t and the contextual information of the terminal at point in time t in the usage association information as the input vector. For example, an application to be used at point in time t+1 may be predicted using an 8-dimensional vector obtained at each sampling point in time, and the training data format may be:

[$APP_t$, TimeSlot, Weekday, Screen, Charging, Battery, Wifi, Location]→$APP_{t+1}$.

The $APP_t$ represents the application used at point in time t; TimeSolt represents the time period when the $APP_t$ is used by the terminal, i.e. the second time category, such as morning peak or evening peak; Weekday represents the date when the $APP_t$ is used by the terminal, i.e. the first time category, such as the working day or holiday; Screen represents the display screen on/off information, such as the display screen is on or the display screen is off; Charging represents whether the terminal is charging, such as the terminal is in a charging state, or the terminal is not in a charging state; Battery represents power quantity information, such as whether the power quantity is high, medium or low; Wifi represents network connection information, such as whether the terminal is connected to a wifi network, or the terminal is not connected to a wifi network; Location represents the location information of the terminal, such as whether the terminal is at home, or not at home; $APP_{t+1}$ represents an application to be used at point in time t+1.

In an exemplary embodiment, the input vector may also include an application used at point in time t−1 in the usage association information. Accordingly, an application to be used at point in time t+1 may be predicted by using the application used at point in time t−1, the application used at point in time t and the contextual information of the terminal at point in time t in the usage association information as the input vector. For example, an application to be used at point in time t+1 may be predicted using a 9-dimensional vector obtained at each sampling point in time, and the training data format may be as follows:

[$APP_{t-1}$, $APP_t$, TimeSlot, Weekday, Screen, Charging, Battery, Wifi, Location]→$APP_{t+1}$, where $APP_{t-1}$ represents the application used at point in time t−1.

The hidden layer may be fully connected to the input layer, and the number of neurons in the hidden layer may be 32. The hidden layer may include at least one of an activation function layer, a pooling layer, and a normalization layer. An activation function of the activation function layer may be a Rectified Linear Unit (ReLU) or a Sofmax function. Example techniques discussed herein may not limit the number and type of the activation functions.

In an exemplary embodiment, $APP_{t+1}$ is in a form of a one-hot code, that is, the application usage state at point in time t+1 may be unique. For example, if the number of target applications is M, and for convenience, the M target applications are represented by 1, 2, . . . , M, then M+1 may represent that no application is used. Assume that M=10 and at point in time t+1, the application with serial number 5 is in use. If the value 0 represents not used and the value 1 represents in use, then the coding vector corresponding to the predicted point in time t+1 is: [0,0,0,0,1,0,0,0,0,0]. For this example, only the position corresponding to serial number 5 is 1, and the rest are all 0.

In order to avoid the over-fitting of the training process, in an exemplary embodiment, the method may also include: temporarily discarding neural network elements in the algorithm model from the neural network according to a predetermined probability to improve the generalization ability of the algorithm model.

In an exemplary embodiment, in a training process using the random gradient descent approach, training may be completed when the loss value is equal to or less than a predetermined loss threshold; or the training may be completed when two or more loss values obtained continuously do not change. After the training is completed, parameters in the prediction model for predicting application startup obtained at this time may be obtained, and may be saved as optimization parameters. When the application prediction is performed by using the prediction model for predicting application startup, the optimization parameters may be used for prediction. Training in the random gradient descent approach may be performed in a small batch manner to obtain the optimal parameters, and the batch size may be 128.

The example prediction model generation method may fully utilize the usage association information of applications and the corresponding contextual information of the terminal which may actually reflect the user behavior, thus ensuring that the generated prediction model for predicting application startup has more optimized parameters, thereby optimizing the application preloading technique, and improving the accuracy of predicting the application to be started.

Figure 3:
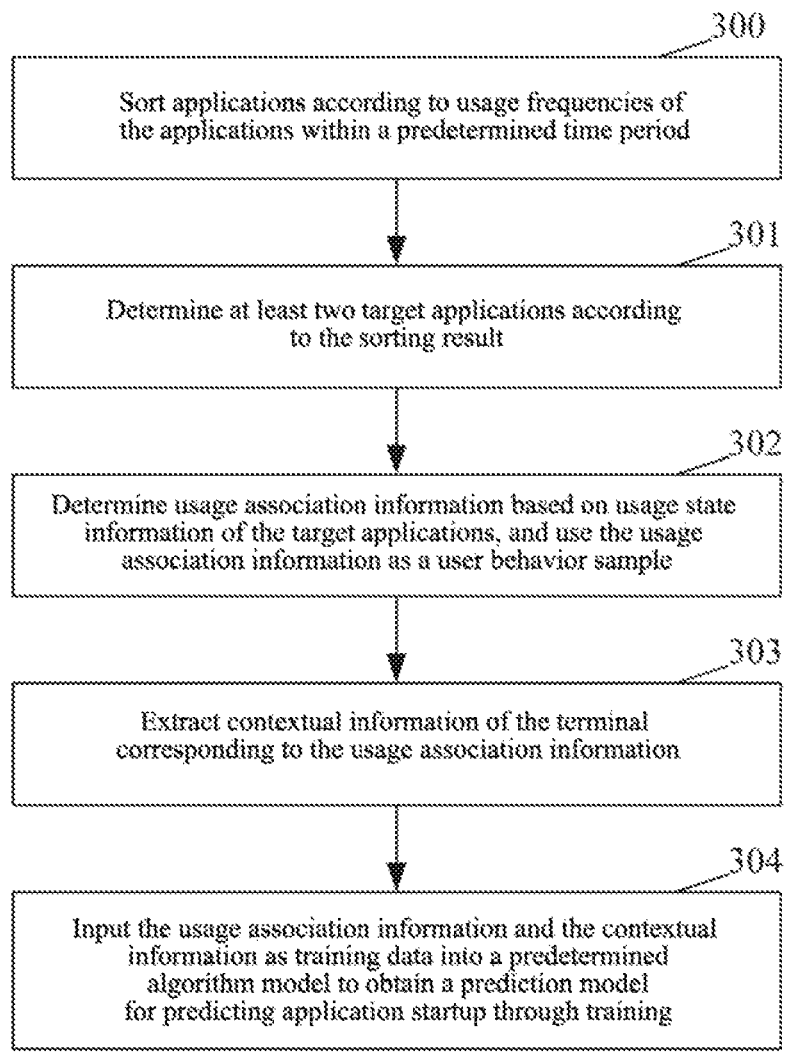
FIG. 3 is a flowchart of a prediction model generation method according to another embodiment of the disclosure.

FIG. 3 is a flowchart of a prediction model generation method according to another embodiment. As shown in FIG. 3, the method may include steps 300-304.

In step 300, applications may be sorted according to usage frequencies of the applications within a predetermined time period.

In step 301, at least two target applications may be determined according to the sorting result of step 300.

In step 302, usage association information may be determined based on usage state information of the target applications, and may be used as a user behavior sample.

In step 303, contextual information of the terminal corresponding to the usage association information of the applications may be extracted.

In an exemplary embodiment, the contextual information of the terminal may include any one or more of: time information, display screen on/off information, power quantity information, network connection information, location information, and information indicating whether the terminal is in a charging status.

In step 304, the obtained usage association information and contextual information may be used as training data and input into a predetermined algorithm model to obtain a prediction model for predicting application startup through training.

The example prediction model generation method may fully utilize the usage association information of applications and the corresponding contextual information of the terminal which may actually reflect the user behavior, thus ensuring that the generated prediction model for predicting application startup has more optimized parameters, thereby optimizing the application preloading technique, and improving the accuracy of predicting the application to be started.

Figure 4:
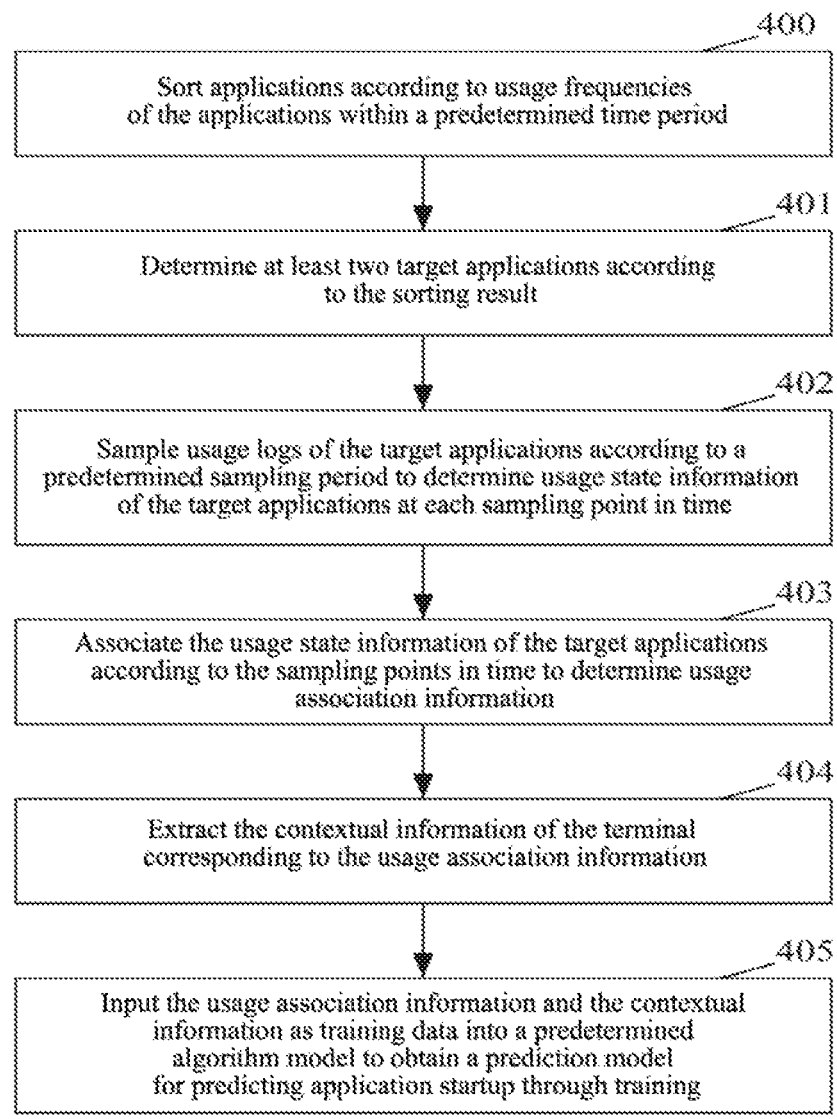
FIG. 4 is a flowchart of a prediction model generation method according to yet another embodiment of the disclosure.

FIG. 4 is a flowchart of a prediction model generation method according to yet another embodiment. As shown in FIG. 4, the method may include steps 400-405.

In step 400, applications may be sorted according to usage frequencies of the applications within a predetermined time period.

In step 401, at least two target applications may be determined according to a result of the sorting of step 400.

In step 402, usage logs of target applications may be sampled according to a predetermined sampling period to determine usage state information of the target applications at each sampling point in time.

In step 403, usage state information of the at least two target applications may be associated according to the sampling points in time to determine usage association information.

In step 404, the contextual information of the terminal corresponding to the usage association information of the applications may be extracted.

In step 405, the obtained usage association information and contextual information may be used as training data and input into a predetermined algorithm model to obtain a prediction model for predicting application startup through training.

The example prediction model generation method may flexibly obtain the usage association information of the applications within the predetermined time period, and further may fully utilize the usage association information of the application and the corresponding contextual information of the terminal which may actually reflect the user behavior, thus ensuring that the generated prediction model for predicting application startup has more optimized parameters, thereby optimizing the application preloading technique, and improving the accuracy of predicting the application to be started.

An example embodiment provides a non-transitory computer-readable storage medium storing computer-executable instructions. When the computer-executable instructions are executed, the prediction model generation method may be implemented.

Figure 5:
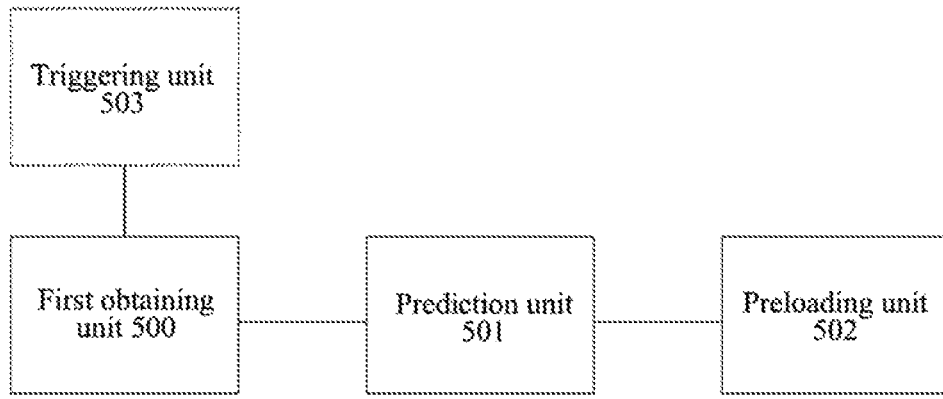
FIG. 5 is a schematic structural diagram of an application preloading apparatus according to an embodiment of the disclosure.

FIG. 5 is a schematic structural diagram of an application preloading apparatus according to an embodiment of the application. The application preloading apparatus may be implemented by software and/or hardware, and may preload the application to be started by implementing the application preloading method. The application preloading apparatus may be integrated into a terminal, which may be a server such as a modeling server for implementing the prediction model generation function for predicting application startup, or a mobile terminal, or the like. As shown in FIG. 5, the application preloading apparatus in the embodiment of the application may include a first obtaining unit 500, a prediction unit 501, and a preloading unit 502.

The first obtaining unit 500 may be configured to obtain application usage state information of the terminal and contextual information of the terminal.

The prediction unit 501 may be configured to input the obtained application usage state information and contextual information into a prediction model that is generated in advance for predicting application startup, and calculate at least one prediction value for application startup. The prediction model may be generated according to usage association information of applications in a predetermined time period and contextual information of the terminal corresponding to the usage association information.

The preloading unit 502 may be configured to determine an application to be started according to the at least one prediction value, and to preload the application to be started.

In an example embodiment, the application preloading apparatus may further include a triggering unit 503 configured to trigger the prediction of the preloaded application.

In accordance with an example application preloading apparatus discussed herein, the application to be started may be more accurately predicted by using the application usage state information and the corresponding contextual information of the terminal, which may advantageously more accurately reflect the user behavior. In this way, a targeted application preloading may be realized, the application preloading technique may be optimized, and the user experience may be improved. Example techniques discussed herein may thus not only improve terminal resource usage, improve power consumption, and improve smoothness of usage of the terminal due to the preload of unnecessary resources of applications, but may also effectively improve the accuracy of the prediction for the application to be started, and may reduce the power consumption and memory consumption of the terminal system (as well as reducing bandwidth usage, data usage, etc.).

In an exemplary embodiment, the contextual information of the terminal may include the contextual information of the terminal corresponding to the point in time at which the application usage state information is obtained, for example, scene information indicating the environmental state in which the terminal is located, such as time information, location information, etc., and state information of the terminal, such as display screen on/off information, power quantity information, network connection information, information indicating whether the terminal is in a charging status, etc.

In an exemplary embodiment, the contextual information of the terminal may include one or more of: time information, display screen on/off information, power quantity information, network connection information, location information, and information indicating whether the terminal is in a charging status.

Figure 6:
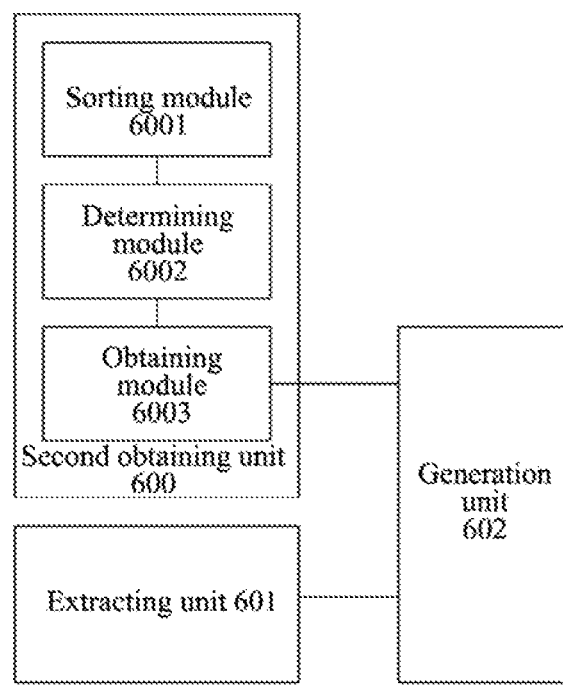
FIG. 6 is a schematic structural diagram of a prediction model generation apparatus according to an embodiment of the disclosure.

FIG. 6 is a schematic structural diagram of a prediction model generation apparatus according to an embodiment of the application. The prediction model generation apparatus may be implemented by software and/or hardware, and may generate the prediction model by implementing the prediction model generation method for predicting application startup. The prediction model generation apparatus may be integrated into a terminal, which may be a server such as a modeling server for implementing the prediction model generation function for predicting application startup, or a mobile terminal, or the like. As shown in FIG. 6, the prediction model generation apparatus may include a second obtaining unit 600, an extracting unit 601, and a generation unit 602.

The second obtaining unit 600 may be configured to obtain a user behavior sample within a predetermined time period. The user behavior sample may include usage association information of at least two applications.

The extraction unit 601 may be configured to extract the contextual information of the terminal corresponding to the usage association information of the applications.

The generation unit 602 may be configured to input the obtained usage association information and contextual information as training data into an algorithm mode to obtain a prediction model for predicting the application startup through training. The algorithm model for predicting application startup may be built in advance.

The example prediction model generation apparatus discussed herein may fully utilize the usage association information of the application and the corresponding contextual information of the terminal which may more accurately reflect the user behavior, thus ensuring that the generated prediction model for predicting application startup has more optimized parameters, thereby optimizing the application preloading technique, and improving the accuracy of predicting the application to be started.

In an exemplary embodiment, the second obtaining unit 600 may include a sorting module 6001, a determining module 6002, and an obtaining module 6003.

The sorting module 6001 may be configured to son the applications according to the order of usage frequencies of the applications within the predetermined time period.

The determination module 6002 may be configured to determine at least two target applications according to a result of the sorting of module 6001.

The obtaining module 6003 may be configured to determine usage association information based on usage state information of the target applications. The usage association information may be used as a user behavior sample.

In an exemplary embodiment, the obtaining module 6002 may be configured to sample usage logs of the target applications according to a predetermined sampling period to determine usage state information of the target applications at each sampling point in time, and associate usage state information of the target applications according to the sampling points in time to determine usage association information.

In an exemplary embodiment, the generation unit 602 may be configured to train the predetermined algorithm model to obtain the prediction model for predicting the application startup according to the usage state information corresponding to the sampling points in time in the usage association information and the contextual information of the terminal.

In an exemplary embodiment, the contextual information of the terminal may include the contextual information of the terminal corresponding to the point in time at which the application usage state information is obtained, for example, scene information indicating the environmental state in which the terminal is located, such as time information, location information, etc., and state information of the terminal, such as display screen on/off information, power quantity information, network connection information, information indicating whether the terminal is in a charging status, etc.

In an exemplary embodiment, the contextual information of the terminal may include any one or more of: time information, display screen on/off information, power quantity information, network connection information, location information, and information indicating whether the terminal is in a charging status.

In an exemplary embodiment, the number of elements in an input layer of the algorithm model may be determined according to a vector dimension of the usage association information and the contextual information of the terminal, and the number of elements in an output layer of the algorithm model may be determined according to the number of applications.

The error function that may be used in the algorithm model is the cross entropy loss function, which may be indicated as:

$$J = \sum_{k=1}^{C} y_k \, \log(\hat{y}_k),$$

where $y_k$ represents a standard value of an application usage state, $\hat{y}_k$ represents a predicted value of the application usage state, and J represents a cross entropy of the algorithm model; and C=M+1, where M represents the number of applications.

Figure 7:
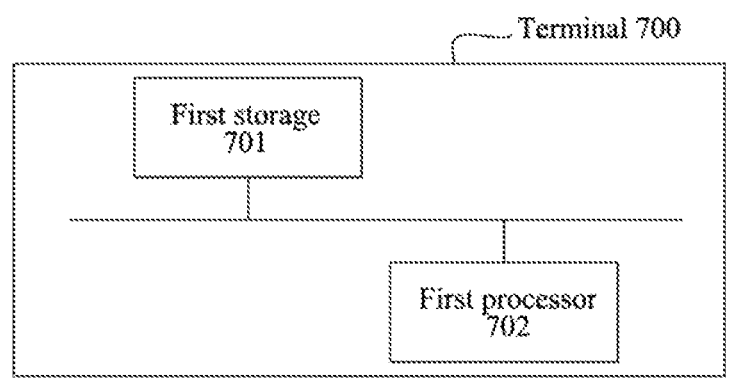
FIG. 7 is a schematic structural diagram of a terminal according to a first embodiment of the disclosure.

An example embodiment herein may provide a terminal in which the prediction model generation apparatus is integrated. FIG. 7 is a schematic structural diagram of a terminal 700 according to the example embodiment. As shown in FIG. 7, the terminal 700 may include a first storage 701 and a first processor 702. A computer program may be stored in the storage 701 and may be executable by the processor 702. When the first processor 702 executes the computer program, the prediction model generation method may be implemented.

The terminal 700 provided by the example embodiment may fully utilize the usage association information of applications and the corresponding contextual information of the terminal 700 which may more accurately reflect the user behavior, thus ensuring that the generated prediction model for predicting application startup has more optimized parameters, thereby optimizing the application preloading technique, and improving the accuracy of predicting the application to be started.

Figure 8:
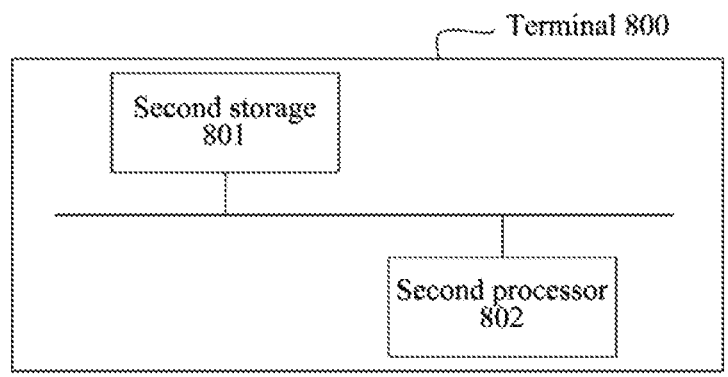
FIG. 8 is a schematic structural diagram of a terminal according to another embodiment of the disclosure.

An example embodiment may provide a terminal in which the application preloading apparatus is integrated. FIG. 8 is a schematic structural diagram of a terminal 800 according to the embodiment. As shown in FIG. 8, the terminal 800 may include a second storage 801 and a second processor 802. A computer program may be stored in the second storage 801 and may be executable on the second processor 802. When the second processor 802 executes the computer program, the application preloading method may be implemented.

The example terminal discussed herein may predict the application to be started more accurately by using the application usage state information and the contextual information of the terminal which may more accurately reflect the user behavior, so that a targeted application preloading may be realized, the application preloading technique may be optimized, and the user experience may be improved. Example techniques discussed herein may thus not only improve terminal resource usage, improve power consumption, and improve smoothness of usage of the terminal due to preload of unnecessary resources, but may also effectively improve an accuracy of predicting the application to be started, and may further reduce the power consumption and memory consumption of the terminal system (as well as reducing bandwidth usage, data usage, etc.).

Figure 9:
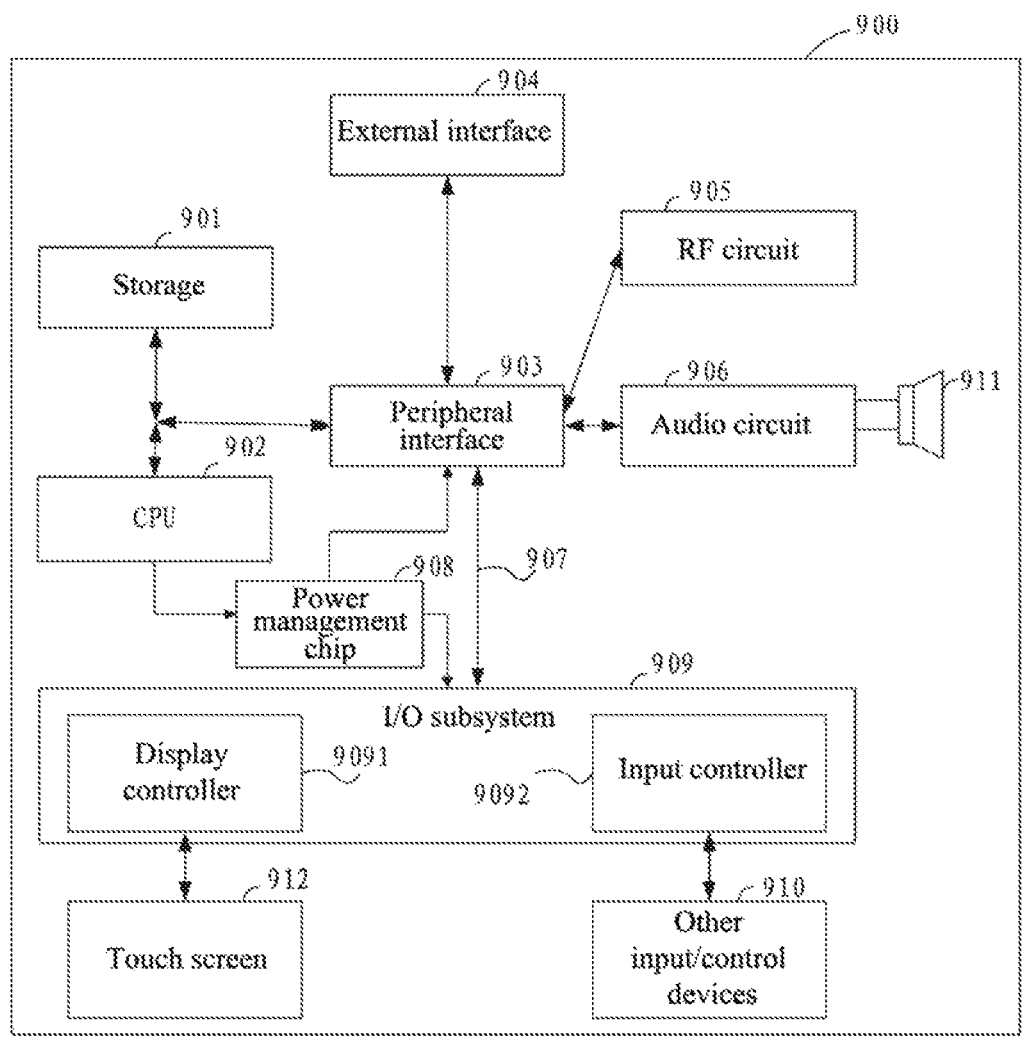
FIG. 9 is a schematic structural diagram of the physical structure of a terminal according to an embodiment of the disclosure.

FIG. 9 is a schematic structural diagram of the physical structure of an example terminal according to an embodiment. As shown in FIG. 9, the terminal may include a housing (not shown in the figure), a storage 901, a central processing unit (CPU) 902 (also referred to as a processor, hereinafter referred to as CPU), a circuit board (not shown in the figure) and a power supply circuit (not shown in the figure). The circuit board may be arranged in the space enclosed by the housing. The CPU 902 and the storage 901 may be arranged on the circuit board. The power supply circuit may be configured to supply power to various circuits or components of the terminal. The storage 901 may be configured to store executable program code. The CPU 902 may run a computer program corresponding to the executable program code by reading the executable program code stored in the storage 901 to implement the steps of: obtaining application usage state information of a terminal and contextual information of the terminal; inputting the application usage state information and the contextual information into a prediction model which is generated in advance for predicting application startup, and calculating at least one prediction value for the application startup; determining an application to be started according to the at least one prediction value, and preloading the application to be started. The prediction model may be generated in advance according to usage association information of applications within a predetermined (e.g., preset) time period and contextual information of the terminal corresponding to the usage association information The terminal also includes a peripheral interface 903, a radio frequency (RF) circuit 905, an audio circuit 906, a speaker 911, a power management chip 908, an input/output (I/O) subsystem 909, a touch screen 912, other input/control devices 910, and an external interface 904. Communication of these components is implemented through one or more communication buses or signal lines 907.

It should be understood that the illustrated terminal 900 is only one example of the terminal, and the terminal 900 may have more or fewer components than shown in the figure, or may combine two or more components, or may have different component configurations. The various components shown in the figure may be implemented in hardware, software, or a combination of hardware and software including one or more signal processing and/or specific integrated circuits. In an exemplary embodiment, the terminal is a mobile phone.

A storage 901, which may be accessed by the CPU 902, the peripheral interface 903, etc., may include high speed random access memory, and may also include non-volatile memory, such as one or more disk memory devices, flash memory devices, or other volatile solid state memory devices.

The peripheral interface 903 may connect input and output peripherals of the apparatus to the CPU 902 and the storage 901.

The I/O subsystem 909 may connect input/output peripherals of the apparatus, such as a touch screen 912 and other input/control devices 910, to the peripheral interface 903. The I/O subsystem 909 may include a display controller 9091, and one or more input controllers 9092 for controlling other input/control devices 910. Herein, one or more input controllers 9092 may receive electrical signals from other input/control devices 910, or send electrical signals to other input/control devices 910. Other input/control devices 910 may include physical buttons (push buttons, rocker buttons, etc.), dials, slide switches, joysticks, and click rollers. It should be noted that the input controller 9092 may be connected to one or more of the following: a keyboard, an infrared port, a USB interface, or a pointing device such as a mouse.

The touch screen 912, which is an input interface and an output interface between the user terminal and the user, may display visual output to the user. The visual output may include graphics, text, icons, videos, etc.

The display controller 9091 in the I/O subsystem 909 may receive electrical signals from or send electrical signals to the touch screen 912. The touch screen 912 may detect the contact on the touch screen, and the display controller 9091 may convert the detected contact into an interaction with the user interface object displayed on the touch screen 912, i.e., may realize man-machine interaction. The user interface object displayed on the touch screen 912 may be an icon for a game, an icon connected to a corresponding network, etc. It should be noted that the apparatus may also include a light mouse, which is a touch sensitive surface that does not display visual output, or an extension of the touch sensitive surface formed by the touch screen.

The RF circuit 905 may be configured to establish communication between the mobile phone and the wireless network (i.e., the network side) to realize data reception and sending between the mobile phone and the wireless network, such as sending and receiving short messages, or e-mail, etc. Specifically, the RF circuit 905 may receive and send RF signals, which may also be referred to as electromagnetic signals. The RF circuit 905 may convert electrical signals into electromagnetic signals or electromagnetic signals into electrical signals, and communicate with communication networks and other devices through the electromagnetic signals. The RF circuit 905 may include known circuits for performing these functions, including but not limited to, an antenna system, an RF transceiver, one or more amplifiers, a tuner, one or more oscillators, a digital signal processor, a codec-decoder chip set, a subscriber identity module (SIM), or the like.

The audio circuit 906 may be configured to receive audio data from the peripheral interface 903, convert the audio data into electrical signals, and send the electrical signals to the speaker 911.

The speaker 911 may be configured to restore voice signals received by the phone from the wireless network through the RF circuit 905 to voice and play the voice to the user.

The power management chip 908 may be configured to supply power and manage power source to the hardware connected with the CPU 902, the I/O subsystem and the peripheral interface.

The prediction model generation apparatus, the storage medium and the terminal provided in the above embodiments may execute the corresponding prediction model generation method, and may have corresponding functional modules and beneficial effects for executing the method. Technical details that are not described in the above embodiments may be similar to those discussed with regard to embodiments relating to the prediction model generation method.

The application preloading apparatus, the storage medium and the terminal provided in the above discussion may execute the corresponding application preloading method, and may have corresponding functional modules and advantageously beneficial effects for executing the method. Technical details that are not described in the above embodiments may be similar to those discussed with regard to embodiments relating to the application preloading method.

It will be apparent to those of ordinary skill in the related art that the modules/units in all of or some of the steps, systems, and apparatus of the methods disclosed herein may be implemented as hardware, software, firmware, or combinations thereof. With hardware implementation, the division of the functional modules/units described herein may not necessarily correspond to the division of the physical units; for example, a physical component may have multiple functions, or a function or step may be performed by the cooperation of several physical components. A few components or all of the components may be implemented by a processor, such as by the software of a digital signal processor or a microprocessor, or can be implemented as an integrated circuit, such as a specialized integrated circuit. This software can be distributed on a computer-readable medium; the computer-readable medium may comprise a non-transitory computer storage medium (i.e., a non-transitory computer readable medium or non-transient medium) and a communication medium (or transient medium). It is well known to those of ordinary skill in the art that communication media typically include computer readable instructions, data structures, program modules, or other data in modulated data signals such as carrier wave or other transmission mechanism, and may include any information delivery media.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An application preloading method comprising:
obtaining application usage state information of a terminal and contextual information of the terminal;
inputting the application usage state information and the contextual information into a pre-generated prediction model, the prediction model being configured to predict application startup and to calculate at least one prediction value for the application startup, wherein the prediction model is pre-generated according to usage association information of applications within a predetermined time period and contextual information of the terminal corresponding to the usage association information; and
determining an application to be started according to the at least one prediction value, and preloading the application to be started;
wherein generating the prediction model for predicting the application startup comprises:
obtaining a user behavior sample within the predetermined time period, wherein the user behavior sample comprises usage association information of at least two applications, wherein the usage association information comprises application usage state information at each sampling point in time within the predetermined time period and a time sequence of using applications within the predetermined time period;
extracting the contextual information of the terminal corresponding to the usage association information of the at least two applications at each sampling point in time within the predetermined time period; and
inputting the usage association information and the contextual information as training data into a predetermined algorithm model, and obtaining the prediction model for predicting the application startup through training:
wherein the algorithm model comprises an input layer, a hidden layer, and an output layer; and
wherein:
a cardinality of elements in the input layer is determined according to a vector dimension of the usage association information and the contextual information of the terminal,
the hidden layer is fully connected with the inout layer, and
a cardinality of elements in the output layer is determined according to a number of applications,
an error function used by the algorithm model is a cross entrpy loss function that is indicated as, $$J = \sum_{k=1}^{C} y_k \ \log(\hat{y}_k),$$

wherein $y_k$ indicates a standard value of an application usage state,

ŷ_k indicates a prediction value of the application usage state, and

J indicates a cross entropy of the algorithm model; and

C=M+1, wherein M indicates the number of applications.

2. The application preloading method according to claim 1, wherein the application usage state information comprises information of an application currently in use, or information indicating that no application is currently in use.

3. The application preloading method according to claim 1, wherein obtaining the user behavior sample within the predetermined time period comprises:
sorting applications according to usage frequencies of the applications within the predetermined time period;
determining at least two target applications according to a result of the sorting; and
determining the usage association information based on usage state information of the target applications.

4. The application preloading method according to claim 3, wherein determining the usage association information based on usage state information of the target applications comprises:
sampling usage logs of the target applications according to a predetermined sampling period to determine usage state information of the target applications at each sampling point in time; and
associating the usage state information of the target applications according to the sampling points in time to determine the usage association information.

5. The application preloading method according to claim 1, wherein the contextual information comprises one or more of:
scene information indicating an environmental state in which the terminal is located, or
state information of the terminal.

6. The application preloading method according to claim 5, wherein:
the scene information comprises at least one of time information or location information; and
the state information comprises one or more of:
information indicating a display screen status of on or off,
power quantity information,
network connection information, or
information indicating whether terminal is in a charging status.

7. A prediction model generation method comprising:
obtaining a user behavior sample within a predetermined time period, wherein the user behavior sample comprises usage association information of at least two applications, wherein the usage association information comprises application usage state information at each sampling point in time within the predetermined time period and a time sequence of using applications within the predetermined time period;
extracting contextual information of a terminal corresponding to the usage association information of the at least two applications at each sampling point in time within the predetermined time period;
inputting the usage association information and the extracted contextual information as training data into a predetermined algorithm model; and
obtaining the prediction model for predicting application startup through training;
wherein the algorithm model comprises an input layer, a hidden layer, and an output layer; and
wherein:
a cardinality of elements in the input layer is determined according to a vector dimension of the usage association information and the contextual information of the terminal, the hidden layer is fully connected with the inout layer, and a cardinality of elements in the output layer is determined according to a number of applications, an error function used by the algorithm model is a cross entrpy loss function that is indicated as, $$J = \sum_{k=1}^{C} y_k \log(\hat{y}_k),$$

wherein $y_k$ indicates a standard value of an application usage state, $\hat{y}_k$ indicates a prediction value of the application usage state, and J indicates a cross entropy of the algorithm model; and C=M+1, wherein M indicates the number of applications.

8. The prediction model generation method according to claim 7, wherein obtaining the user behavior sample within the predetermined time period comprises:
sorting applications according to usage frequencies of the applications within the predetermined time period;
determining at least two target applications according to a result of the sorting; and
determining the usage association information based on usage state information of the target applications.

9. The prediction model generation method according to claim 8, wherein the determining the usage association information based on usage state information of the target applications comprises:
sampling usage logs of the target applications according to a predetermined sampling period to determine usage state information of the target applications at each sampling point in time; and
associating the usage state information of the target applications according to the sampling points in time to determine the usage association information.

10. The prediction model generation method according to claim 9, wherein inputting the usage association information and the contextual information as training data into the predetermined algorithm model, and obtaining the prediction model for predicting application startup comprises:
training the algorithm model according to the usage state information corresponding to each sampling point in time in the usage association information and the contextual information of the terminal, to obtain the prediction model for predicting the application startup.

11. The prediction model generation method according to claim 7,
wherein the at least two applications are included in an application usage record; and
the method further comprises:
deleting an invalid application usage record entry in the application usage record within the predetermined time period.

12. The prediction model generation method according to claim 7, wherein the contextual information comprises one or more of:
scene information indicating an environmental state in which the terminal is located, or
state information of the terminal.

13. The prediction model generation method according to claim 12, wherein:
the scene information comprises one or more of time information or location information; and the state information comprises one or more of:
information indicating a display screen status of on or off,
power quantity information,
network connection information, or
information indicating whether the terminal is in a charging status.

14. A terminal comprising: a processor, and a memory storing a computer program that is executable by the processor to perform steps of:
obtaining application usage state information of a terminal and contextual information of the terminal;
inputting the application usage state information and the contextual information into a pre-generated prediction model, the prediction model being configured to predict application startup and to calculate at least one prediction value for the application startup, wherein the prediction model is pre-generated according to usage association information of applications within a predetermined time period and contextual information of the terminal corresponding to the usage association information; and
determining an application to be started according to the at least one prediction value, and preloading the application to be started;
wherein generating the prediction model for predicting the application startup comprises:
obtaining a user behavior sample within the predetermined time period, wherein the user behavior sample comprises usage association information of at least two applications, wherein the usage association information comprises application usage state information at each sampling point in time within the predetermined time period and a time sequence of using applications within the predetermined time period;
extracting the contextual information of the terminal corresponding to the usage association information of the at least two applications at each sampling point in time within the predetermined time period; and
inputting the usage association information and the contextual information as training data into a predetermined algorithm model, and obtaining the prediction model for predicting the application startup through training;
wherein the algorithm model comprises an input layer, a hidden layer, and an output layer; and
wherein:
a cardinality of elements in the input layer is determined according to a vector dimension of the usage association information and the contextual information of the terminal,
the hidden layer is fully connected with the inout layer, and
a cardinality of elements in the output layer is determined according to a number of applications,
an error function used by the algorithm model is a cross entrpy loss function that is indicated as, $$J = \sum_{k=1}^{C} y_k \log(\hat{y}_k),$$

wherein $y_k$ indicates a standard value of an application usage state,
$\hat{y}_k$ indicates a prediction value of the application usage state, and
J indicates a cross entropy of the algorithm model; and
C=M+1, wherein M indicates the number of applications.

15. The terminal according to claim 14, wherein the application usage state information comprises information of an application currently in use, or information indicating that no application is currently in use.

16. The terminal according to claim 14, wherein obtaining the user behavior sample within the predetermined time period comprises:
sorting applications according to usage frequencies of the applications within the predetermined time period;
determining at least two target applications according to a result of the sorting; and
determining the usage association information based on usage state information of the target applications.

17. The terminal according to claim 16, wherein determining the usage association information based on usage state information of the target applications comprises:
sampling usage logs of the target applications according to a predetermined sampling period to determine usage state information of the target applications at each sampling point in time; and
associating the usage state information of the target applications according to the sampling points in time to determine the usage association information.

* * * * *